United States Patent
Archibald, Jr. et al.

(10) Patent No.: US 6,658,528 B2
(45) Date of Patent: Dec. 2, 2003

(54) SYSTEM AND METHOD FOR IMPROVING FILE SYSTEM TRANSFER THROUGH THE USE OF AN INTELLIGENT GEOMETRY ENGINE

(75) Inventors: John E. Archibald, Jr., Boulder, CO (US); Brian D. McKean, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 09/918,415

(22) Filed: Jul. 30, 2001

(65) Prior Publication Data
US 2003/0023818 A1 Jan. 30, 2003

(51) Int. Cl.[7] .............................................. G06F 12/00
(52) U.S. Cl. ...................................................... 711/112
(58) Field of Search .............................. 713/1; 711/111, 711/112, 154

(56) References Cited

U.S. PATENT DOCUMENTS

| | | | |
|---|---|---|---|
| 5,333,305 A | | 7/1994 | Neufeld ....................... 395/575 |
| 5,408,644 A | * | 4/1995 | Schneider et al. ............. 714/1 |
| 5,613,088 A | | 3/1997 | Achiwa et al. ............. 395/482 |
| 5,657,468 A | | 8/1997 | Stallmo et al. ............. 395/441 |
| 5,737,741 A | | 4/1998 | Hilditch et al. ............. 711/114 |
| 5,799,140 A | | 8/1998 | Niijima et al. ......... 395/182.04 |
| 5,809,224 A | | 9/1998 | Schultz et al. ......... 395/182.05 |
| 5,859,965 A | | 1/1999 | Gittins et al. .......... 395/185.05 |
| 5,915,094 A | | 6/1999 | Kouloheris et al. ..... 395/200.49 |
| 6,128,717 A | * | 10/2000 | Harrison et al. ............. 711/202 |
| 6,195,650 B1 | * | 2/2001 | Gaither et al. .................. 707/1 |
| 6,219,693 B1 | * | 4/2001 | Napolitano et al. ......... 709/203 |
| 6,256,643 B1 | * | 7/2001 | Cork et al. .................. 707/205 |
| 6,301,605 B1 | * | 10/2001 | Napolitano et al. ......... 709/201 |
| 6,381,615 B2 | * | 4/2002 | Gaither et al. .............. 707/200 |
| 2001/0014892 A1 | * | 8/2001 | Gaither et al. .............. 707/200 |
| 2002/0073279 A1 | * | 6/2002 | Sasamoto et al. ........... 711/114 |
| 2003/0037187 A1 | * | 2/2003 | Hinton et al. .................. 710/1 |

FOREIGN PATENT DOCUMENTS

WO      WO 9313475 A1 * 7/1993 ............. G06F/3/06

* cited by examiner

*Primary Examiner*—Kevin Verbrugge
(74) *Attorney, Agent, or Firm*—Kunzler & Associates (57) ABSTRACT

An improved system and method for handling input/output (I/O) data transfers between storage devices and file systems is disclosed. The file system is made aware of the geometry of the storage device either through automatic querying of the storage device or through user input. The file system then intelligently employs the information about the geometry of the storage device to optimize data storage transfers between the file system and the storage device. The optimization may involve, for instance, storing volume header information in full array subsystem stripes, making disk and object geometry available in volume headers, accessing and applying volume set configuration parameters, placing file directory information at strip/stripe boundaries, strategically placing blocks and clusters of data, and applying knowledge of locking segment size.

27 Claims, 6 Drawing Sheets

SYSTEM AND METHOD FOR IMPROVING FILE SYSTEM TRANSFER THROUGH THE USE OF AN INTELLIGENT GEOMETRY ENGINE

BACKGROUND OF THE INVENTION

1. The Field of the Invention

The present invention relates to file systems and storage devices used within digital computer systems. More specifically, the present invention relates to manners of transferring data in file systems to and from storage devices during read and write cycles.

2. The Relevant Art

As the use of computers becomes increasingly prevalent, it has become necessary to store large amounts of data that cannot be directly stored on a personal computer or workstation at remote locations. Local area networks (LANs) and storage area networks (SANs), which typically include one or more file servers acting as storage hubs for data, are often used in large volume remote data storage.

In situations where large volumes of data storage is required, the file servers often employ arrays of direct access storage devices (DASDs) such as hard disk drives to store the data at a central location of the LAN or SAN. Such storage device subsystems are currently characterized by a predominant volume set geometry. The volume set geometry of the storage device affects the manner in which data is stored and may consist of several member disks partitioned into extents. The extents are mapped directly into volume sets, or are mapped into redundancy groups or parts of redundancy groups which are mapped into volume sets.

Each extent is further partitioned into one or more strips. A strip represents a number of contiguous logical blocks that are mapped onto an extent on a member disk in a volume set. A strip size, typically expressed in kilobytes, is associated with a strip. The immediately preceding or subsequent contiguous logical blocks in the volume set are mapped onto another extents on another member disk in the volume set. The strips on each of the extents are collectively grouped into stripes. A stripe consists of a strip on each member disk of the storage device.

As data is written to the device, it may be written in essentially one of two ways. Either the data consumes a full strip or multiple full strips, or it consumes a partial strip. A partial strip access incurs some read/modify/write performance penalty. This penalty occurs when the parity strip associated with the data being written is locked for updating. Any other data that may share the parity strip with the data being written may incur a resource lock penalty while the parity strip is locked during the write access.

This penalty may be avoided by performing an on-boundary full strip write access to the storage device. When an on-boundary full strip write access occurs, all the data sectors in the full stripe are being updated, and the necessary information for updating the parity strip may be generated in-line as opposed to separately. This process is able to update the parity strip at he same time that data is being written to the device so no separate lock is needed to update the parity strip.

Furthermore, within the storage device, an operating method is employed for locking data segments during read/write operation to protect the integrity of the stored data when the data may be accessed through multiple data paths. The size of the lockable data segment may be a fraction of the strip size, equivalent to the strip size, a multiple of the strip size, or a multiple of a fraction of the strip size.

Current operating environment file system implementations range in their ability to be configured at file system creation time for such parameters as file system blocking factor. This blocking factor defines the smallest common unit for allocation of contiguous data sectors to the file system. The blocking factor further defines the smallest data transfer size that will be passed to the Input/Output (I/O) subsystem driver.

When current operating environment file system implementations are created, such parameters as blocking factor and cluster size of the file system of the file system are defined independent of stripe size and locking segment size of the storage device. Since the operating environment file system is unaware of the geometry of the storage device, performance problems often occur during I/O operation between the file systems and the storage system. One of theses types of problems is the read/modify/write penalty associated with the necessity of writing a partial stripe of data because the file system cluster size does not correspond to the stripe size of the storage device.

Another of ten-encountered problem involves segment locking during write operations. During write operations, data is often locked, as described above, to maintain data integrity during the write access. A resource conflict will occur if an attempt is made to write data to a stripe that is already locked by another write process. Current file systems have no knowledge of storage device locking strategies and thus, often attempt to write to a segment that is already locked by another write process.

Accordingly, a need exists in the art for an intelligent geometry engine file system that is aware of the geometry of the storage device and is capable of using that knowledge to perform I/O operations in a more efficient manner.

OBJECTS AND BRIEF SUMMARY OF THE INVENTION

The intelligent geometry engine file system of the present invention has been developed in response to the present state of the art, and in particular, in response to the problems and needs in the art that have not yet been fully solved by currently available intelligent geometry engine file systems. Accordingly, it is an overall object of the present invention to provide an intelligent geometry engine file system that overcomes many or all of the above-discussed shortcomings in the art.

To achieve the foregoing object, and in accordance with the invention as embodied and broadly described herein in the preferred embodiment, an intelligent geometry engine file system is provided. The intelligent geometry engine file system of the present invention provides increased performance and efficiency in the operation of data input/output (I/O) systems. The file system obtains data about the geometry of the storage device either by automatically querying the storage device at file system creation time or by allowing a user to input the storage device parameters. The intelligent geometry engine file system then manages I/O requests to and from the storage device in such a manner that full advantage is taken of the geometry of the storage device.

The geometry of the storage device may include such parameters as the data stripe size of the storage device, the data placement method of the storage device, or the segment locking method of the storage device. The use of the information about the geometry of the storage device ensures that when data is written to the storage device, the data is written in such a manner that write accesses always occur at stripe boundaries. By ensuring that write accesses always occur at stripe boundaries, the number of segment locks decrease, as does the seek time of the write head. This decrease in the number of segment locks and in seek time substantially increases performance of the I/O operations of the data storage system.

Other manners of applying the intelligent geometry include storing volume header information in multiples of a full stripe, making disk/object geometry available in a volume header, accessing and applying configuration parameters during run-time, placing file directory information at the strip/stripe boundaries, strategically placing blocks and clusters according to the disk geometry, and strategically applying knowledge of the locking size to minimize conflicts and store locking data in caches.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
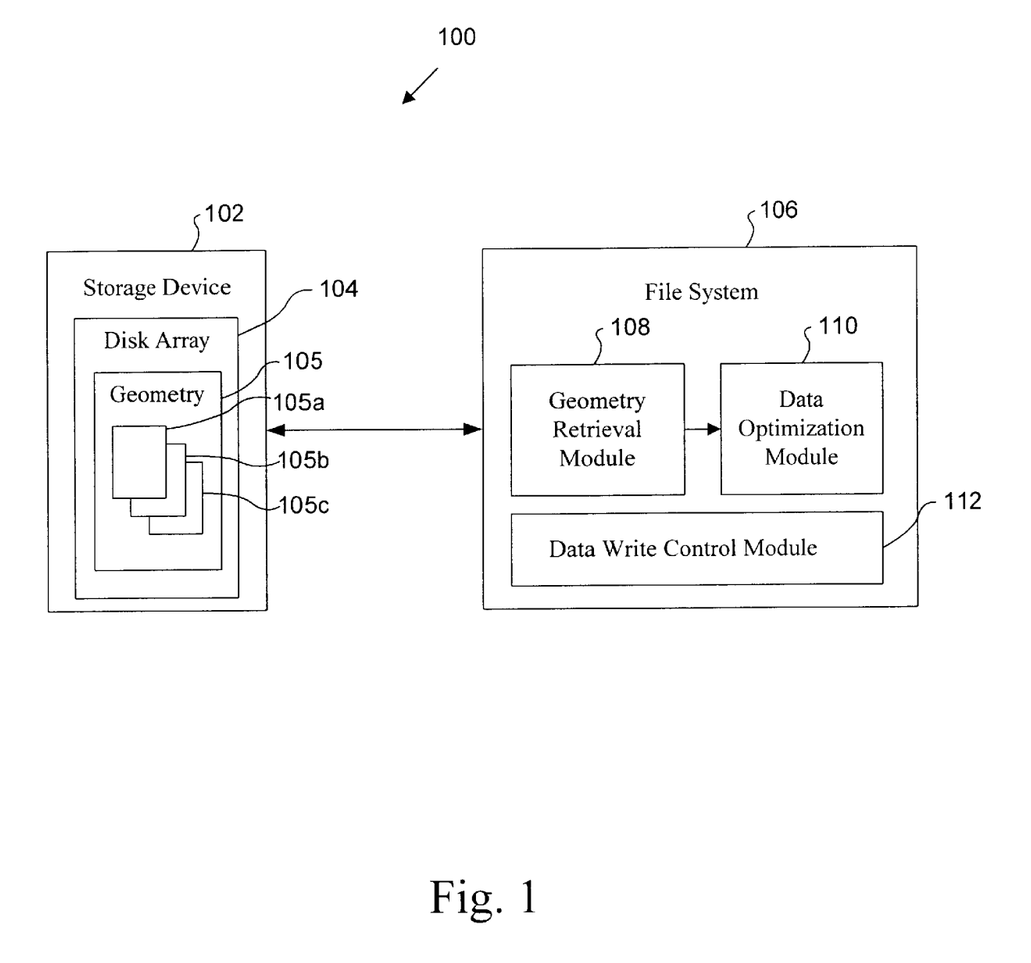
FIG. 1 is a schematic block diagram illustrating one embodiment of a data storage system suitable for use with the present invention.

FIG. 1 is a schematic flow chart diagram illustrating one embodiment of a data storage system 100 of the present invention. The data storage system 100 comprises a storage device 102 and a file system 106. The storage device 102 further comprises an array of hard disk drives 104 upon which the data is stored. The hard disk array 104 has a specific geometry 105 associated with it and listed as geometry data 105a–105c. The geometry 105 may include such parameters as the data stripe size, the data placement method, and the segment locking method of the disk array 104.

The file system 106 of the present invention is shown with a storage device geometry retrieval module 108, a data optimization module 110, and a data write control module 112. The storage device geometry retrieval module 108 is configured to receive the geometry parameter data 105a–105c for use by the data optimization module 110. In one embodiment the geometry retrieval module 108 automatically interrogates the storage device 102 and retrieves the geometry parameter data 105a–105c. The geometry parameters may also be entered by a user or from a file. The data optimization module 110 is configured to receive the storage device geometry data from the storage device geometry retrieval module 108.

Once the geometry retrieval module 108 has received the geometry data, it evaluates the geometry data 105a–105c to determine the conditions for the optimum I/O operation of the file system 106. The conditions for optimum I/O operations may include, but are not limited to, storing volume header information in segment of the storage device that is equal to an even multiple of the volume set stripe size, storing a file and its associated meta data in the same stripe, creating a relationship between the file system cluster size and the storage device stripe size, and prioritizing write requests in such a manner that performance penalties due to conflicts created by segment locking are avoided.

When the data optimization module 110 completes the evaluation of the geometry of the storage device 102, it transmits the data to the data write control module 112. The data write control module 12 then uses the information obtained from the data optimization module 110 to configure write operations directed to the storage device 102. The data that is to be written to the storage device 102 is formatted by the data write control module 112 to correspond to the geometry of the storage device 102 as evaluated by the data optimization module 110.

Figure 2:
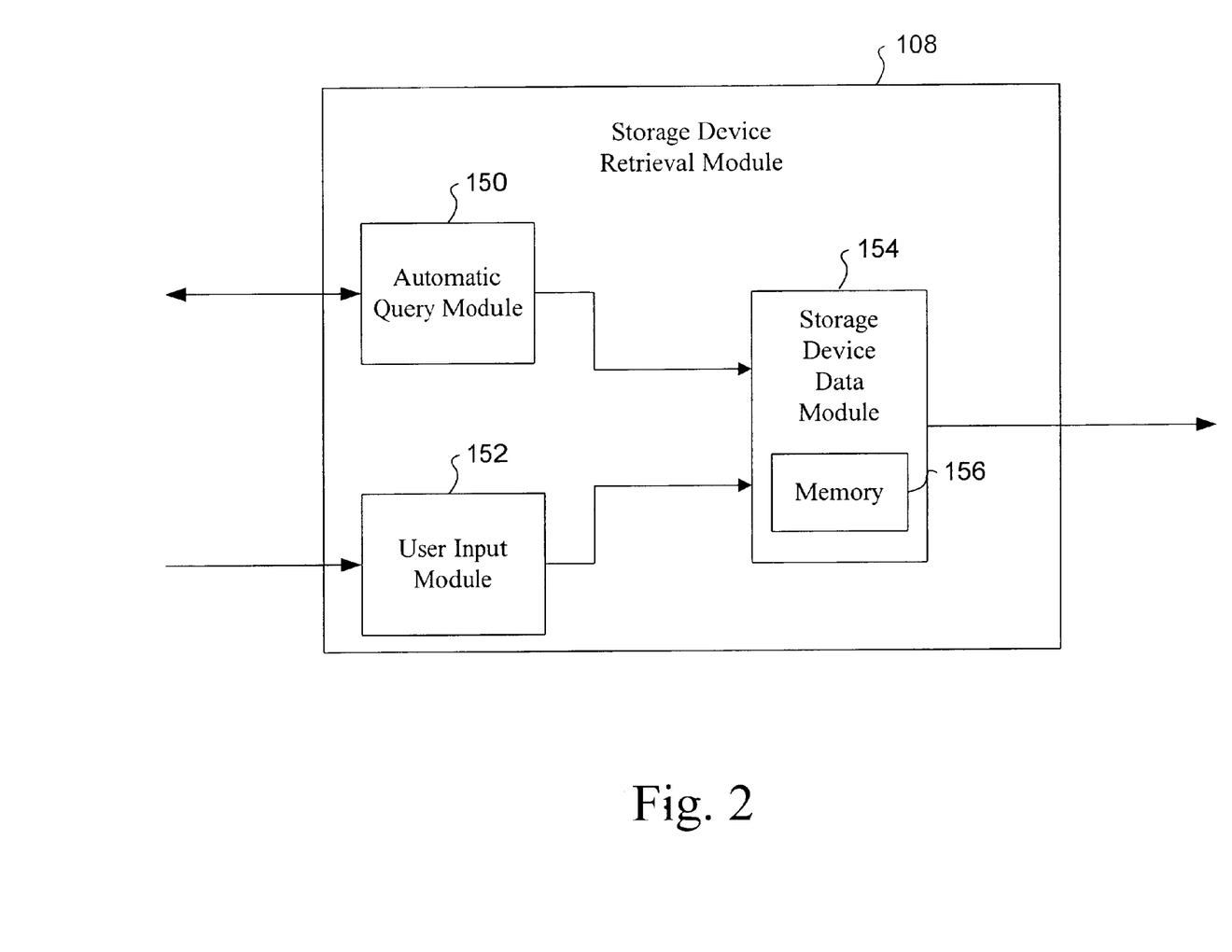
FIG. 2 is a schematic block diagram illustrating one embodiment of a storage device geometry retrieval module of the present invention.

FIG. 2 is an illustration of one embodiment of a geometry retrieval module 108. The geometry retrieval module 108 comprises an automatic query module 150, a user input module 152, storage device geometry data module 154, and a memory 156. The storage device geometry retrieval module 108 is preferably configured to retrieve the information about the geometry of the storage device 102 of FIG. 1 using one of two methods.

In the first method, the user input module 152 is configured to prompt a qualified user, such as a system administrator, to enter the storage device geometry data at the time the storage device is initialized. As a user enters the storage device geometry data, the data is transmitted to the storage device geometry data module 154. The storage device geometry data module 154 is configured to retain the storage device geometry data in a memory 156 until the data optimization module 110 of FIG. 1 needs the data. When the storage device 102 of FIG. 1 is initialized, the geometry of the storage device is specified and stored within the storage device 102 of FIG. 1. The user input module 152 could also receive the geometry data 105a–105c through a prepared file, such as a text document prepared with a predetermined format and transmitted either from a user or by the storage device 102.

In the second method of obtaining the storage device geometry data, the automatic query module 150 queries the storage device 102 of FIG. 1 for the storage device geometry data. Preferably, the query takes place after the storage subsystem configuration and before file system creation. The geometry data is then transmitted through the automatic query module 150 to the storage device geometry data module 154 and is retained in the memory 156 until the data optimization module 110 of FIG. 1 needs the geometry data.

Figure 3:
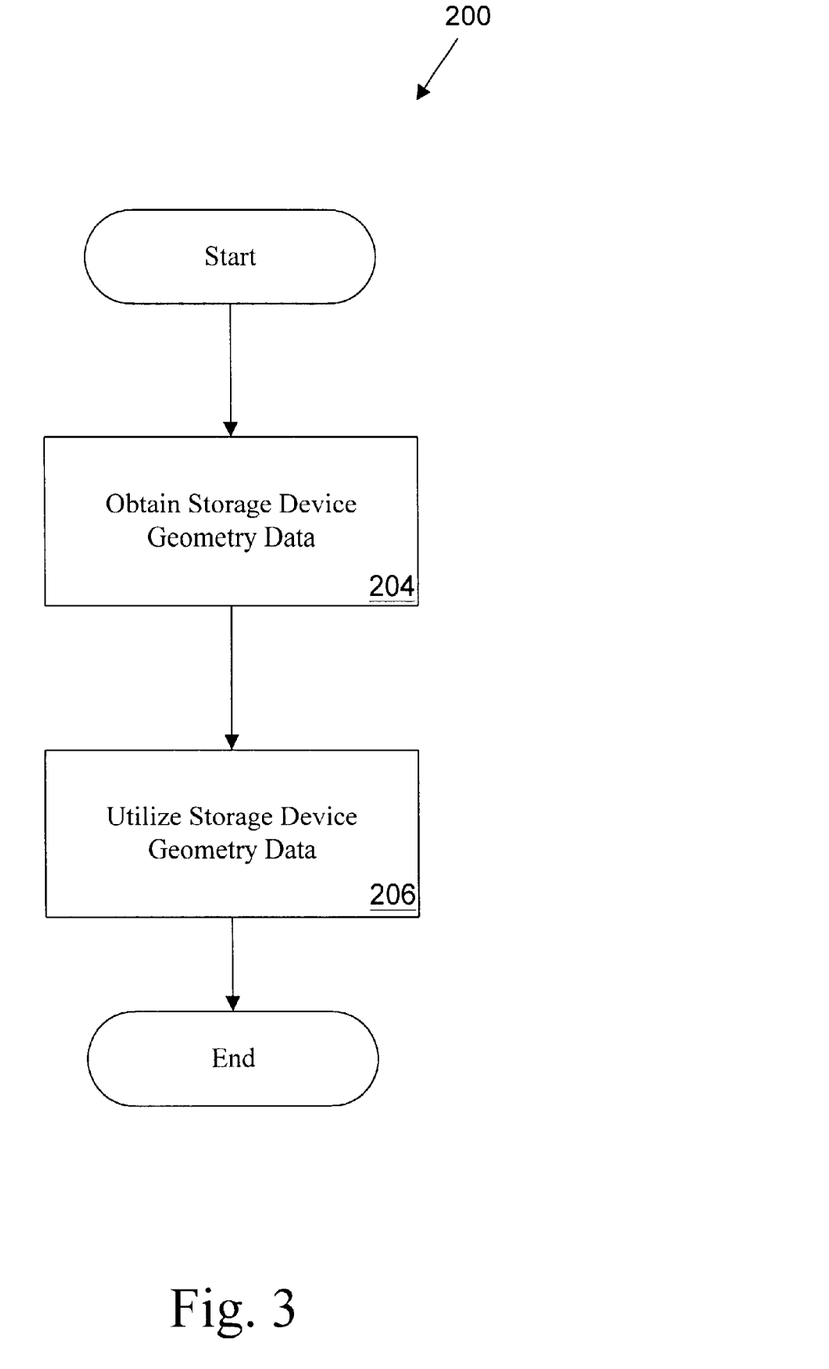
FIG. 3 is a schematic flow chart illustrating one embodiment of a method of the present invention for obtaining and utilizing the geometry parameters of a storage device to increase the I/O performance of a data storage system.
Figure 4A:
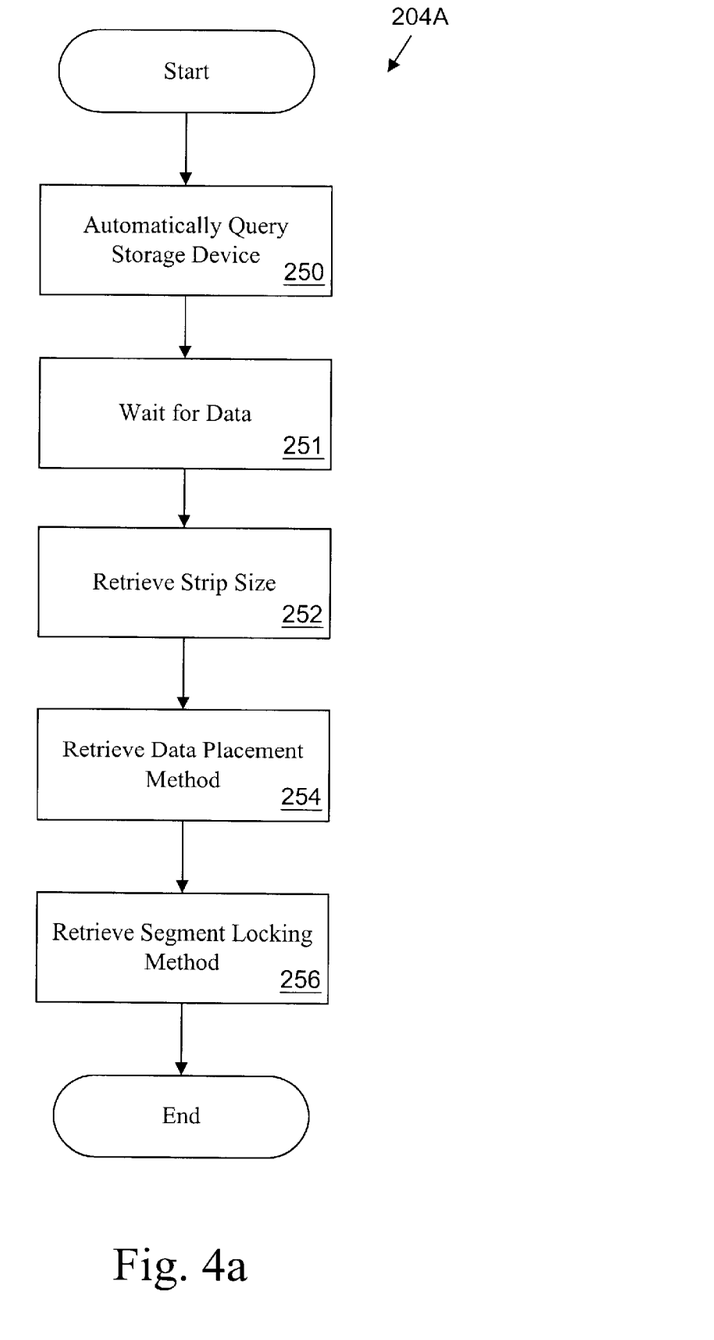
FIG. 4a is a schematic flow chart illustrating one embodiment of a method of the present invention for automatically obtaining the geometry parameters of a storage device.
Figure 4B:
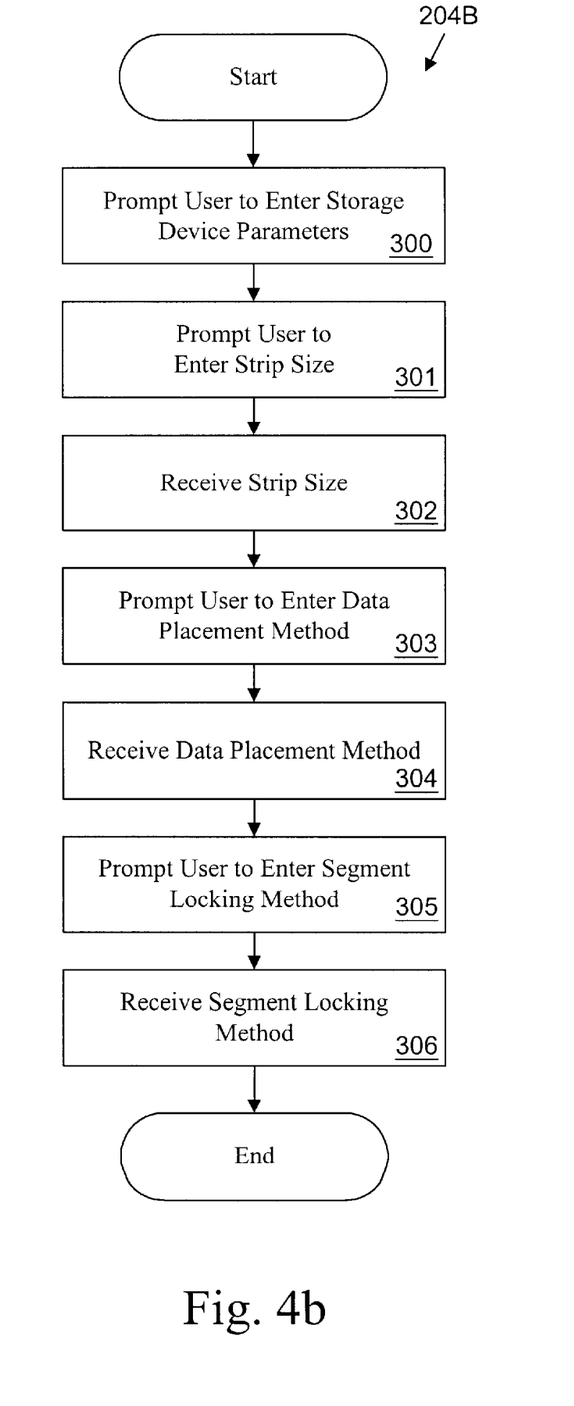
FIG. 4b is a schematic flow chart illustrating one embodiment of a method for obtaining the geometry parameters of a storage device through user entry.

FIG. 3 is a schematic flow chart diagram illustrating one embodiment of a method 200 for optimizing data Input/Output (I/O) transfers between a storage device and a file system. The method 200 starts and transitions to a step 204, where data about the geometry configuration of a storage device is obtained. Referring to FIGS. 4a and 4b, the step 204 of obtaining data about the geometry configuration of a storage device may be accomplished in one of two methods. FIG. 4a is a schematic flow chart diagram illustrating one method 204A of obtaining the storage device geometry data.

In a step 250, the method automatically queries the storage device for a plurality of data describing the geometry of the storage device. In one example, the storage device is queried (e.g., by the automatic query module 150 of FIG. 2) for the strip size, the data placement method, and the segment locking method of the storage device. Once the query has been sent to the storage device in the step 250, the method waits for the data to be sent from the storage device in a step 251. The storage device then sends the data, and as illustrated, the strip size is received in a step 252, the data placement method is received in a step 254, and the segment locking method is received in a step 256. After the geometry 105a–105c data has been received in the steps 252 through 254, the geometry data is stored in a step 258 (e.g., in the data optimization module 110 of FIG. 1) for use in optimizing the I/O transfers between the storage device and the file system.

FIG. 4b is a schematic flow chart diagram illustrating a second method 204B for obtaining the storage device geometry data. In a step 300, a user is requested to input storage device geometry data 105a–105c. Once the user has been notified in the step 300, the user is prompted for the storage device strip size in a step 301. When the user enters the storage device strip size, it is received in a step 302. Next, the user is prompted for the data storage device data placement method in a step 303, and the data placement method is received from the user in a step 304. Finally, the user is prompted for the storage device segment locking method in a step 305, and the segment locking method is received from the user in a step 306.

Of course, once again, the storage system geometry data 105a–105c could also be input with a file that is read by the user input module 152 of FIG. 2.

Once the user has entered the requested geometry data 105a–105c, the geometry data 105a–105c is stored for use in optimizing the data I/O transfers in a step 308. The examples of strip size, data placement method, and segment locking method as storage device geometry parameters are illustrative only and should in no way be considered the only parameters that may be requested and utilized by the present invention.

Figure 5:
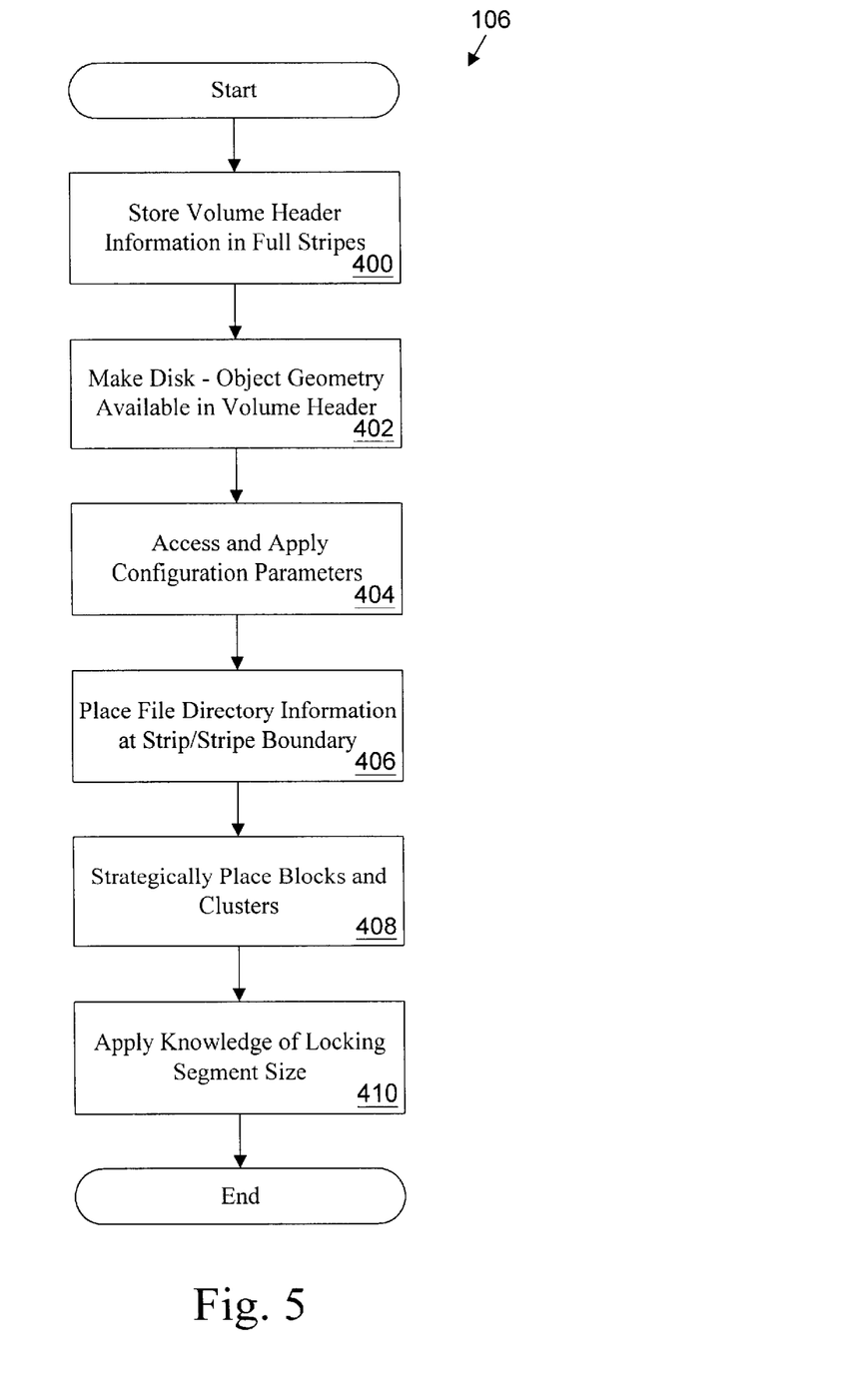
FIG. 5 is a schematic flow chart illustrating one embodiment of a method of the present invention for utilizing knowledge of the geometry parameters of a storage device to increase the I/O performance of a data storage system.

FIG. 5 is a schematic flow chart diagram illustrating one embodiment of a method 106 of utilizing knowledge of the storage device geometry data as indicated in step 206 of FIG. 3. The various steps of the method 106 may be conducted in any order, and need not all be employed together. Other similar manners of automatically utilizing knowledge of storage device geometry parameters will be readily apparent from this disclosure, and may also be employed under the invention, either individually or with one or more of the techniques of FIG. 5.

At a step 400 of the method 106, volume header information, also referred to volume table of contents (VTOC) is stored in one or more multiples of a full stripe. Knowing the stripe size allows this. In the case that the header information does not fill a segment that is equal to an even multiple of the volume set strip size, the portion that is not filled is padded with irrelevant data. By writing the header information in a segment that is equal to an even multiple of the volume set strip size, all file data written to the storage device may then be written on a strip boundary. This practice is used to decrease the penalties associated with RAID 5 write accesses. Advantages of doing so are quicker write operations, as less rewriting must be conducted. In fact, because the data distribution over the different storage sectors is known, the write operation and associated parity recording can be conducted in a similar manner to a Raid 3 write operation where parity data is written on the fly, rather than in the manner of a slower Raid 5 write operation where multiple read and write operations are required for generating parity data.

This is because write operations can begin at the zero location within a stripe, rather than at a mid point, where the volume header information ends. That is, the file system may be set up to perform a cache flush such that for streaming writes, and entire stripe worth of information is flushed at a time. This is considered to be the optimal method to write to a RAID 5 storage volume. In order to get optimal, the write data should start at the first data block of the string and include all the data in the stripe. This allows the storage device to write the entire stripe, including parity, without having to read any information on disk in order to calculate the parity for the stripe. In order for the user data in the file system to be written in this fashion, all of he metadata used by the file system, including he volume header information and the I-nodes must start and end on stripe boundaries. If the metadata ends in the middle of a stripe and shares the stripe with user data, then a streaming read to that stripe would only write the user data and the storage device would have to read existing metadata from the volume to calculate the parity stripe. Particularly, write operations are faster when they begin at the relative offset 0, the next sector beyond the header, and the request size matches or is a multiple of a full stripe size. Such write operations are then written as on-boundary full stripe writes by the disk array subsystem.

At a step 402, geometry data such as disk and object geometry is made available in the volume header. Thus, the geometry data is made available to the file system during run-time. The file system may then take steps to employ knowledge of the geometry data during write operations. For instance, information such the number of theoretical heads, cylinders, and sectors may be made available for use by file systems such as pre-SCSI file systems that make use of this data. This data may be employed to overlay theoretical cylinders onto a full stripe boundary of multiple thereof, for example. This is more efficient for data streaming applications. Such an overlay onto a strip boundary may also be used in other situations, as may the general knowledge of disk and object geometry.

At a step 404, the configuration parameters are automatically made available to the file system, and are accessed and applied. Thus, the configuration parameters are available at run-time, rather than just at volume creation time. These parameters may include, e.g., strip size, full stripe size, lockable segment size, and the like. They may be automatically queried by the file system generation routine at file system creation time, or passed to the file system generation routine in the form of arguments at file system creation time. These parameters are then preferably used to algorithmically generate the optimal file system geometry for overlay onto a particular volume set in the disk array subsystem.

At a step 406, file directory information (such as i-nodes) may be placed at strip/stripe boundaries. Thus, the necessity of reading from or writing to two places each time a file is accessed can be eliminated. With file directory information at strip/stripe boundaries, less data can be locked when accessing both file directory information and data that would otherwise be in the same stripe as the file directory information when the file system writes data and/or directory information. Additionally, more RAID 3-like writes can be conducted when using this technique.

This advantage is obtained due to the fact that in RAID 3 operations, the size of a strip is very small B perhaps only a byte, or a sector of 512 bytes. Accordingly, it is very easy to get an entire stripe worth of data to write so that parity can optimally be computed. By optimizing the file system to do full stripe writes on stripe boundaries, a RAID 5 write can be as fast as possible.

In one embodiment, the file directory is placed in the same data stripe as the data it describes, allowing continuous write operations when both data and meta data are required to be modified.

In one embodiment, the file directory is placed in the same data stripe as the data it describes, allowing continuous write operations when both data and meta data are required to be modified.

At a step 408, blocks and clusters are strategically placed in accordance with the known storage system geometry 105. For example, file system blocks may be placed on and within strip boundaries and/or full stripe boundaries. File system clusters may be placed on and within strip boundaries and/or on and within full stripe boundaries. Additionally, the file system may be configured to establish a relationship between the file system block size and the volume set strip size. For instance, the file system block size may be selected to be a fraction of the strip size, equivalent to the strip size, or a multiple of the strip size. When making the block size a multiple of the strip size is favored, as it would improve performance and reduce contention for segment locks where multiple data input/output operations attempt to access unique but adjacent sections of data.

Other manners of strategically placing blocks and clusters includes the file system establishing a relationship between the file system cluster size and the volume set full stripe size. For instance, the file system cluster size may be selected to be a fraction of the volume set full stripe size, equivalent to the full stripe size, or a multiple of the volume set full stripe size. The latter two selections are favored as they would improve file system input/output performance with sequential write operations such as data streaming applications. By creating a relationship between the cluster size and the strip size, it becomes easier to store file data on the storage device in even multiples of strips. This helps to ensure that file data is stored on strip boundaries and that RAID 3 reads and writes may be used, thus avoiding the performance penalty incurred through the use of RAID 5 reads and writes.

A further manner of strategically placing blocks and clusters comprises employing a method that overlays a single file or record per strip on and within strip boundaries with a truly random locality of reference within the volume set. This method is most favorably employed where file systems are required to service large volumes of small random input/output accesses from transaction processing intensive applications. In order to minimize resource contention at the disk array subsystem, the file system may use its geometry knowledge in an attempt to avoid multiple Raid 5-type write accesses to other strips contained in the same full stripe that share the same parity strip and where such accesses may overlap in time.

At a step 410, knowledge of the locking segment size is made available and applied. For instance, the disk array subsystem may employ methods of locking segments of read or write in its cache memory. The disk array subsystem in order to restore redundancy following a disk drive failure will use the redundant information to rebuild the lost data on a replacement disk drive. The array will typically lock some part of a volume to prevent the host computer from trying to change data while the data to be rebuilt is calculated. The size of the lock area is usually a multiple of the stripe size. If the file system performs storage array accesses also on stripe boundaries the interference with rebuild operations is minimized.

The disk array subsystem may allow access to the volume through multiple paths and may lock segments of the volume so that access is only through a single path at a time. Again the lock segment is typically a multiple of a stripe size. If the file system uses multiple access paths to the storage array subsystem then knowledge of the performance impact of which paths to use would allow the file system to optimize the path selection Additionally, the file system may employ methods of locking segments of data on rotating media. Thus, for instance, knowledge of the locking segment size allows locking segment size to be: a fraction of the volume set strip size or full strip size; equivalent to the strip size or full stripe size; a multiple of the volume set strip size or full stripe size; or a multiple or fraction of the strip size or fall stripe size. Any of these may be strategically employed. Thus, for instance, where the locking size is not identical to the stripe size or full stripe size, the file system may use the knowledge of locking segment size and strip/stripe size to align requests for inputs/outputs and corresponding required data locks with segment lock size.

Using the locking segment size, the order or write operations may also be reordered so that adjacent segments of data can be written in order, in one contiguous write operation. This allows only a single block and contiguous write operations and allows other write operations that are directed to data that is not locked to be conducted in parallel.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of using knowledge of storage device geometry in data transfers between a file system and a storage device comprising:

providing a file system with knowledge of the geometry of the storage device; and automatically applying knowledge of the geometry of the storage device to optimize the performance of interactions between the file system and the storage device.

2. The method of claim 1, wherein obtaining data relating to the geometry of the storage device further comprises automatically querying the storage device at file system creation time to obtain the data relating to the geometry of the storage device.

3. The method of claim 1, wherein obtaining data relating to the geometry of the storage device further comprises passing the data relating to the geometry of the storage device as parameters to the file system generation routine at file system creation time.

4. The method of claim 1, wherein the data relating to the geometry of the storage device further comprises the data stripe size of the storage device.

5. The method of claim 1, wherein the data relating to the geometry of the storage device further comprises the data placement method of the storage device.

6. The method of claim 1, wherein the data relating to the geometry of the storage device further comprises the segment locking method of the storage device.

7. The method of claim 1, wherein automatically applying knowledge of the geometry of the storage device to optimize the performance of interactions between the file system and the storage device further comprises storing the volume header information in a segment of the storage device that is equal to an even multiple of the volume set stripe size.

8. The method of claim 1, wherein automatically applying knowledge of the geometry of the storage device to optimize the performance of interactions between the file system and the storage device further comprises making geometry information available to the file system in the volume header.

9. The method of claim 1, wherein automatically applying knowledge of the geometry of the storage device to optimize the performance of interactions between the file system and the storage device further comprises the file system accessing data indicative of the geometry of the storage device and applying the data at run-time.

10. The method of claim 1, wherein automatically applying knowledge of the geometry of the storage device to optimize the performance of interactions between the file system and the storage device further comprises placing file directory information at strip boundaries.

11. The method of claim 1, wherein automatically applying knowledge of the geometry of the storage device to optimize the performance of interactions between the file system and the storage device further comprises strategically placing blocks and clusters in accordance with the knowledge of the storage device geometry.

12. The method of claim 1, wherein automatically applying knowledge of the geometry of the storage device to optimize the performance of interactions between the file system and the storage device further comprises the file system applying the knowledge of the locking segment size.

13. A method for improving the performance of file system data transfer to a storage device comprising:

automatic querying of the storage device by the file system generation process at file system creation time;

passing the data about the geometry of the storage device to the file system generation process as parameters at file system creation time;

receiving the data stripe size of the storage device;

receiving the data storage methods of the storage device;

receiving the segment locking methods of the storage device, storing the volume header information in a segment of the storage device that is equal to an even multiple of the volume set stripe size;

making disk geometry available to the file system in the volume header;

consistently placing file directory information at strip boundaries;

strategically placing blocks and clusters; and applying knowledge of locking segment size.

14. An intelligent geometry engine file system comprising:

a storage device;

a file system connected to the storage device;

a storage device geometry retrieval module within the file system configured to obtain information relating to the geometry of the storage device; and a storage optimization module within the file system configured to automatically apply knowledge of the geometry of the storage device to optimize the performance of interactions between the file system and the storage device.

15. The intelligent geometry engine file system of claim 14, wherein the storage device comprises an array of disks configured to be accessed through the use of RAID technology.

16. The intelligent geometry engine file system of claim 14, wherein the storage device geometry retrieval module is further configured to automatically query the storage device at file system creation time to obtain the data relating to the geometry of the storage device.

17. The intelligent geometry engine file system of claim 14, wherein the storage device geometry retrieval module is further configured to accept data relating to the geometry of the storage device as input parameters to the file system creation process at file system creation time.

18. The intelligent geometry engine file system of claim 14, wherein the storage device geometry retrieval module is further configured to retrieve the data stripe size of the storage device.

19. The intelligent geometry engine file system of claim 14, wherein the storage device geometry retrieval module is further configured to retrieve the data placement method of the storage device.

20. The intelligent geometry engine file system of claim 14, wherein the storage device geometry retrieval module is further configured to retrieve the segment locking method of the storage device.

21. The intelligent geometry engine file system of claim 14, wherein the storage device optimization module is further configured to store the volume header information in a segment of the storage device that is equal to an even multiple of the volume set stripe size.

22. The intelligent geometry engine file system of claim 14, wherein the storage optimization module is further configured to make disk geometry available to the file system in the volume header.

23. The intelligent geometry engine file system of claim 14, wherein the storage device optimization module is further configured to access and apply the configuration parameters.

24. The intelligent geometry engine file system of claim 14, wherein the storage optimization module is further configured to consistently place file directory information at strip boundaries.

25. The intelligent geometry engine file system of claim 14, wherein the storage optimization module is further configured to strategically place blocks and clusters.

26. The intelligent geometry engine file system of claim 14, wherein the storage optimization module is further configured to apply knowledge of the locking segment size.

27. An intelligent geometry engine file system comprising:
   a means for storing digital data;
   a file system connected to the digital data storage means;
   a means for obtaining information relating to the geometry of the storage device; and
   a means for automatically applying knowledge of the geometry of the storage device to optimize the performance of interactions between the file system and the storage device.

* * * * *

UNITED STATES PATENT AND TRADEMARK OFFICE
CERTIFICATE OF CORRECTION

PATENT NO. : 6,658,528 B2
DATED : December 2, 2003
INVENTOR(S) : Archibald, Jr. et al.

It is certified that error appears in the above-identified patent and that said Letters Patent is hereby corrected as shown below:

Column 1,
Line 41, "another extents" should read -- extents --.
Line 60, "at he same" should read -- at the same --.

Column 2,
Line 13, "system of the file system are" should read -- system are --.
Line 23, "of ten-encountered" should read -- often encountered --.

Column 3,
Line 55, "flow chart diagram" should read -- block diagram --.

Column 4,
Line 17, "in segment" should read -- in a segment --.
Line 27, "control module 12" should read -- control module 112 --.

Column 5,
Line 24, "254" should read -- 256 --.
Line 47, "transfer in a step 308" should read -- transfers --.

Column 6,
Line 19, "and entire" should read -- an entire --.
Line 27, "all of he metadata" should read -- all of the metadata --.
Line 28, "including he volume" should read -- including the volume --.
Line 45, "such the" should read -- such as the --.
Line 49, "multiple thereof" should read -- multiples thereof --.

UNITED STATES PATENT AND TRADEMARK OFFICE
CERTIFICATE OF CORRECTION

PATENT NO. : 6,658,528 B2
DATED : December 2, 2003
INVENTOR(S) : Archibald, Jr. et al.

It is certified that error appears in the above-identified patent and that said Letters Patent is hereby corrected as shown below:

<u>Column 7,</u>
Line 10, "small B" should read -- small, --.
Line 41, "includes" should read -- include --.

Signed and Sealed this

Twentieth Day of April, 2004

JON W. DUDAS
*Acting Director of the United States Patent and Trademark Office*